Jan. 26, 1937.  C. M. FRANCISCO  2,068,740
AUTOMOBILE HEATER
Filed April 17, 1936   2 Sheets-Sheet 1
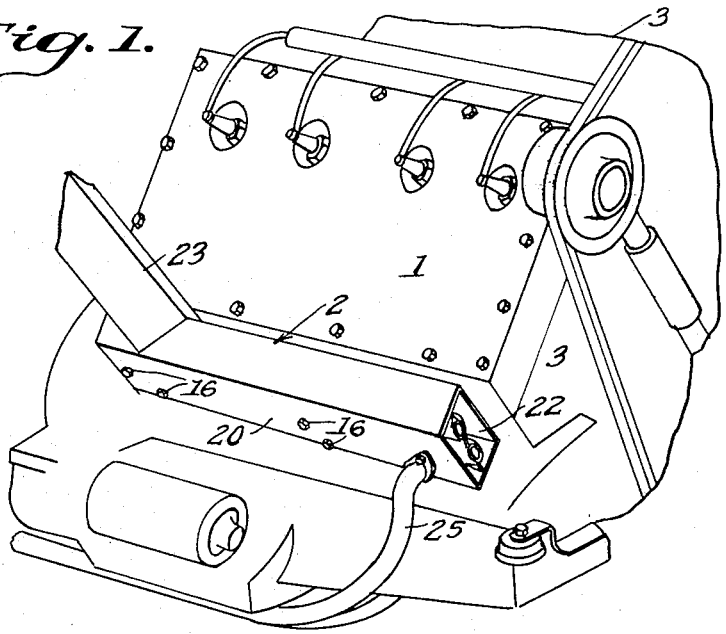
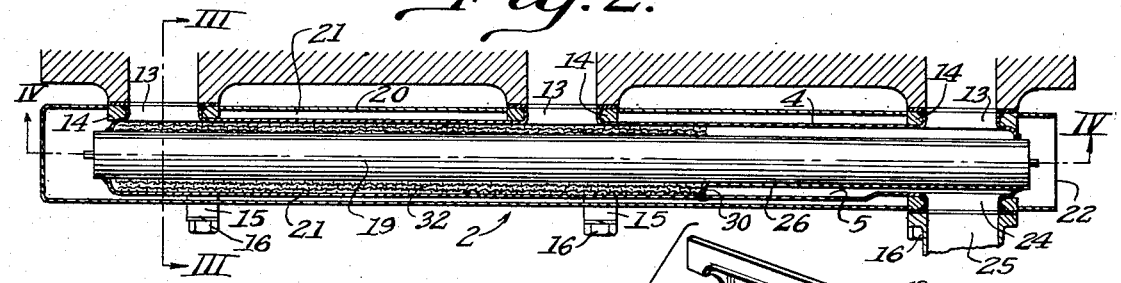
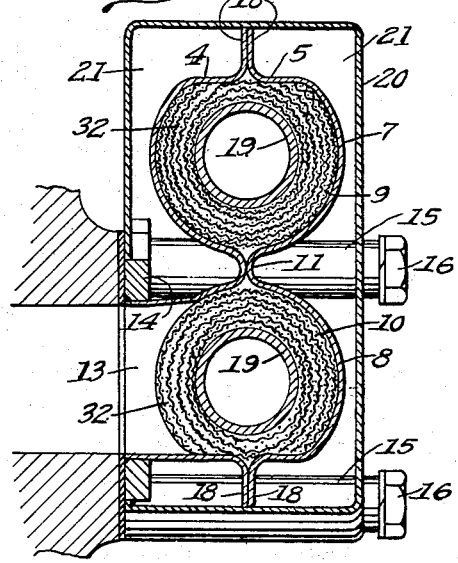
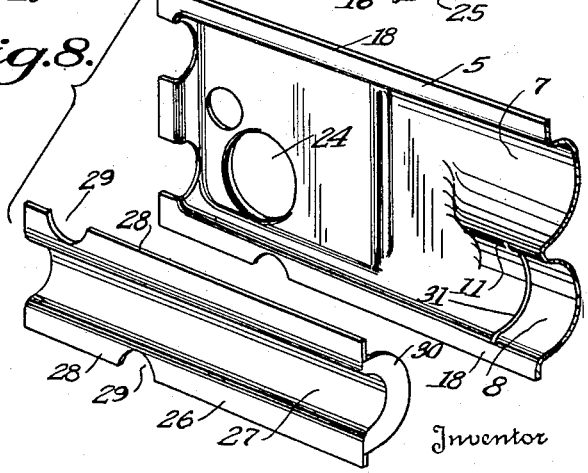
Inventor
Charles M. Francisco
W. S. McPowell
Attorney Jan. 26, 1937.  C. M. FRANCISCO  2,068,740
AUTOMOBILE HEATER
Filed April 17, 1936   2 Sheets-Sheet 2
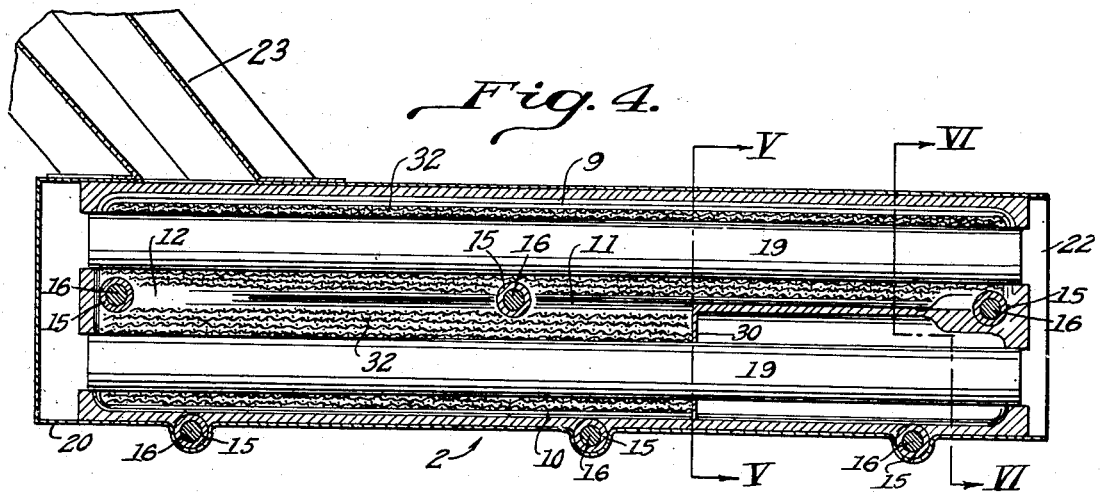
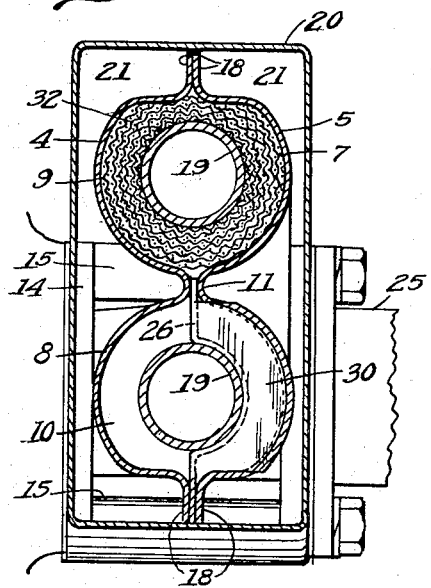
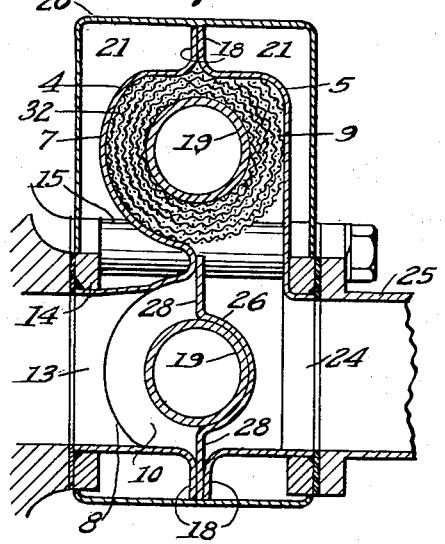
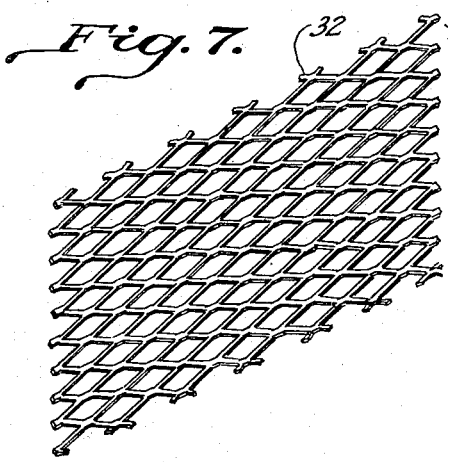
Inventor
Charles M. Francisco
By W. S. McDowell
Attorney Patented Jan. 26, 1937

2,068,740

UNITED STATES PATENT OFFICE 2,068,740

AUTOMOBILE HEATER

Charles M. Francisco, Columbus, Ohio, assignor to Francisco Auto Heater Company, Columbus, Ohio, a corporation of Ohio Application April 17, 1936, Serial No. 74,989

10 Claims. (Cl. 257—241)

This invention relates to improvements in automobile heaters, and has particular reference to a combined exhaust manifold and heater which may be readily connected with the exhaust gas outlets of an automotive engine and used with comfort, silence and efficiency in the matter of heating the passenger-carrying compartment of an enclosed motor vehicle body.

In accordance with the present invention, a sheet metal exhaust manifold is provided which is formed to include parallel, longitudinally extending exhaust gas conveying passages, the latter being united at one end of the manifold with a return bend so that the exhaust gases traverse the manifold through said passages by a flow first in one direction and then in the opposite, whereby to provide a manifold of relatively short length but with a maximum amount of heat liberating area and one which enables a large part of the heat contained within the engine exhaust gases to be absorbed by the air passing through the heater in indirect heat exchanging relationship with the exhaust gases traveling through said passages, so that the air will be heated to required temperatures necessary for passenger comfort but with the use of a heater and manifold construction of relatively short length.

It is another object of the invention to provide a combined exhaust gas manifold and air heater having the above constructional and operating characteristics and wherein each of the parallel exhaust gas passages is provided with an open-ended longitudinally extending conduit, which extends axially and longitudinally through said passages in spaced relationship from the outer walls thereof, one end of each of said conduits being open to the atmosphere at the front of the associated engine and the other being connected with means for transferring the heated air removed from the discharge ends of said conduits to the associated vehicle body.

It is also a further object of the invention to surround the sheet metal exhaust gas manifold with a metallic casing open to the atmosphere at its front and communicating at its rear with the interior of the vehicle body, so that fresh air may travel through the casing, contacting with the heated exterior walls or surfaces of the exhaust manifold proper and thereby heated to an adequate temperature for use in warming the vehicle passenger compartment.

A further important object of the invention resides in the provision of a manifold heater of the above identified character wherein provision is made for enabling the same to operate silently, and to this end the invention comprehends the provision of a foraminated covering situated to surround the outer walls of the air heating conduits and in direct contact with the heated engine exhaust gases traveling through the manifold passages, the said covering or netting serving to dampen noise-producing vibrations within the manifold and thereby overcoming an outstanding objection to vehicle heaters of the manifold type.

Other objects reside in the provision of an economical, easily installed and conveniently manufactured heater and manifold which may be readily applied to the side of an automobile engine, replacing the ordinary exhaust manifold of such an engine and in the provision of a heater which should be efficient and effective in operation, particularly when used on engine blocks of short length and in the formation of a heater of rigidly assembled construction which is devoid of relatively movable parts.

For a further understanding of the invention, reference is to be had to the following description and the accompanying drawings, wherein:

Fig. 1 is a perspective view of a motor vehicle engine equipped with the combined heater and manifold comprising the present invention;

Fig. 2 is a horizontal longitudinal sectional view of the heater and manifold;

Fig. 3 is a vertical transverse sectional view on the plane indicated by the line III—III of Fig. 2;

Fig. 4 is a vertical longitudinal sectional view on the plane indicated by the line IV—IV of Fig. 2;

Figs. 5 and 6 are vertical transverse sectional views taken through the heater and manifold on the lines V—V and VI—VI, respectively, of Fig. 4;

Fig. 7 is a perspective view of the expanded metal covering employed in silencing the operation of the heater;

Fig. 8 is a perspective view showing the forward end of the outer section of the manifold and the division plate or baffle carried in connection therewith.

Referring more particularly to the drawings, the numeral 1 designates an internal combustion engine of the type used in motor vehicles, and the numeral 2 indicates the combined manifold and heater mechanism comprising the present invention. The engine 1 to which the heater mechanism is especially applicable, comprises a pair of angularly related V-shaped cylinder blocks 3, the latter being of the type found in the presently manufactured Ford automobile.

While the specific manifold and heater disclosed in the accompanying drawings has been especially designed for use in connection with the Ford motor vehicle engine, nevertheless it will be appreciated that the invention is much wider in scope and may be readily adapted to engines of other manufacture. However, in the V-type of engine, there are but four cylinders on each side, with the result that the length of the engine or of each cylinder block thereof is much shorter than engines of the type having a comparable number of cylinders arranged in a straight line. The shorter cylinder blocks admit of the use of exhaust manifolds of correspondingly short length, with the result that when a heater casing is placed around such a manifold, there is not sufficient heat radiating surface on the short length manifold to raise the temperature of the air passing through the heater to the required degree for the comfortable heating of the motor vehicle passenger compartment, particularly in regions where severe winter conditions are encountered. This is likewise true of the so-called "hot-water" type of heater, wherein a portion of the cooling fluid of the engine is circulated through a small radiator, disposed in the passenger compartment, and the heat of the fluid removed in part by the action of a motor driven fan blowing air through the radiator.

Recognizing the need for a more efficient heater than those hitherto offered the public, and one which is especially efficient when used in colder latitudes, the present invention provides the combined manifold and heater, indicated at 2. To secure the required degree of heat it has been found necessary to develop a special type of manifold which replaces the ordinary cast exhaust manifold provided in connection with such engines by the manufacturer, so that the latent heat of the exhaust gases traveling through the manifold may be more effectively and efficiently used for vehicle heating purposes than heretofore.

In lieu of employing a cast manifold, the present invention comprehends the provision of a manifold formed from sheet metal comprising complemental inner and outer longitudinally extending sections 4 and 5 respectively. Each of these sections is formed from a sheet metal stamping so that it will readily transmit and give off heat. The said sections are each stamped or pressed to produce upper and lower, parallel, longitudinally extending depressions 7 and 8 respectively, so that when the sections are in joined relationship, and welded to each other, there will be produced within the manifold parallel, longitudinally extending upper and lower passages 9 and 10 respectively for the travel of exhaust gases discharged from the engine 1.

The depressions 7 and 8 are so produced that at the rear end of the heater, the intermediate web 11, formed between said passages, will be dispensed with so that in effect a return bend 12 is produced at the rear end of the manifold, whereby engine exhaust gases entering the lower passage 10 by way of the ports 13 will first be caused to travel lengthwise of the lower passage 10 in a rearward and longitudinal direction, then upwardly through the return bend 12 and forwardly and longitudinally through the upper passage 9. The ports 13 are reenforced by and welded to relatively heavy clamping plates and sleeves 14 and 15 respectively, through which the fastening bolts 16, stationarily projecting from the side of the engine 1, pass and have their outer ends equipped with nuts for effecting the mounting of the combined heater and manifold in connection with the side of the associated engine.

The upper and lower longitudinally extending edges of the manifold are provided with complemental vertically disposed flanges 18 which are securely welded to each other to produce gastight passages. Positioned longitudinally and axially in each of the passages 9 and 10 are tubular air heating conduits 19. These conduits are considerably smaller in diameter than the passages 9 and 10 so that annular spaces will be formed between the outer surfaces of said conduits and the inner surfaces of the manifold for the travel of the heated engine exhaust gases. The forward ends of the conduits are open to the atmosphere and project beyond the closed forward end of the manifold so that during operation of the associated vehicle, fresh air will be caused to travel longitudinally through the conduits 19, contacting with the heated walls of the latter and thereby raising the temperature of the air to a relatively high degree prior to its discharge from the open rear ends of said conduits. The latter project beyond the closed rear end of the manifold and terminate within the confines of a substantially rectangular sheet metal heater casing 20, which is welded or otherwise secured to the manifold.

Except for the edges of the flanges 18, the walls of the casing 20 are spaced from the outer walls of the manifold to provide an air passageway 21, in order that air drawn into the open front 22 of the casing may circulate over the heated exterior surfaces of the manifold to remove heat from the latter and thereby raise the temperature of the air to a satisfactory vehicle heating degree during travel of the air through the passageway 21. Air heated by passage through the conduits 19 and the passageway 21 is transferred from the rear end of the casing 20 to the passenger compartment (not shown) of a motor vehicle by way of the angular duct 23, connected with the rear of the casing 20 and in open communication with the interior thereof.

As shown in Fig. 2, the lower passage 10 of the manifold is provided with three of the spaced ports, indicated at 13, for the admission of the engine exhaust gases into the manifold. As stated, these exhaust gases travel longitudinally and rearwardly through the passage 10 and thence longitudinally and forwardly through the upper passage 9. In order to permit of the adaption of the manifold and heater to standard engine parts and to avoid the use of special fittings, the exhaust gas outlet 24 of the manifold and heater is disposed in the plane of the lower passage 10, as shown in Fig. 6. This permits of the use of a standard pipe connection 25 in association with the heater and manifold for conveying the spent and exhaust gases to the muffler of the vehicle, since if the outlet 24 were disposed in the plane of the upper passage 9, special fittings would have to be utilized.

Therefore, in order to use this construction and to compel the exhaust gases to travel substantially the full length of each of the passages 9 and 10, the forward ends of said passages are relatively separated by the provision of a division plate 26, which has been disclosed more particularly in Figs. 5, 6 and 8. This division plate is formed with a semi-circular longitudinally extending groove 27, so that the plate may closely surround the forward end of the lower of the conduits 19, and the said groove 27 terminates in upwardly and downwardly directed vertically aligned flanges 28. The upper of the flanges 28 is welded or otherwise secured between the webs 11 of the manifold and the lower of the flanges 28 is likewise confined between the lower of the abutting flanges 18 of said manifold. The flanges 28 are notched as at 29 for the reception of the fastening sleeves and bolts 15 and 16 which are employed in uniting the heater and casing with the side of an associated engine. The rear of the plate 26 terminates in a laterally bent, semi-circular end wall 30, having the outer edges thereof received within a slot 31 formed in the outer section 5 of the manifold, the said end wall serving to block off the forward part of the passage 10 from the downwardly directed forward region of the passage 9. By this construction, a practical means is afforded for separating said passages in order that communication between the same will be established at the rear end of the manifold only, and at the same time to provide for the use of standard engine parts in association with the heater.

In the operation of a manifold and heater employing the sheet metal construction set forth, considerable noise is frequently developed, which is transmitted to the passenger compartment and is quite objectionable to the vehicle occupants. While the causes of this noise are not fully appreciated, it is thought that they are largely attributable with the rythmic contact of the exhaust gases striking on the walls of the conduits 19. Whatever the cause, however, it has been found that such noise can be largely, if not entirely, eliminated by surrounding the outer surfaces of said conduits with a foraminated covering capable of resisting the high temperatures of the exhaust gases.

As a practical form of covering, it has been discovered that the use of an expanded metal screen, of the type indicated in Fig. 7, functions very satisfactorily as a noise eliminating or reducing medium. This screen or covering is formed from a ferrous alloy containing chromium so that the metal comprising the screen or covering will not be softened or destroyed by contact with the high temperature exhaust gases. The said screen or covering, indicated by the numeral 32, circularly surrounds each of the conduits 19 and either by dampening vibration on the part of said conduits or by interrupting the exhaust gas flow thereover, the noise which would otherwise be created is effectively reduced or eliminated.

In view of the foregoing, it will be seen that the present invention provides a compact and efficient combined heater and manifold having approximately but four cylinders in alignment. Considering its relatively short length, the construction of the heater and manifold provides augmented heat radiating and liberating surfaces to produce thorough and efficient transfer of heat from the engine exhaust gases to the atmospheric air drawn into the device for heating and subsequent delivery to the body of the vehicle. Moreover, the device may be readily applied as a unit to the side of an associated engine by merely substituting the same for the ordinary cast exhaust manifold and generally dispenses with the use of motor driven fans or relatively movable parts which are quite likely to become out of order during operation. It is, of course, within the scope of the invention to place a fan in the duct 23, if desired, but operation has disclosed that when the motor vehicle is in motion, sufficient quantities of air are forced through the heater to render unnecessary the use of auxiliary circulation creating devices.

What is claimed is:

1. An automobile heater comprising a manifold formed from a pair of sheet metal sections welded together along their contacting edges, said sections being formed to include a pair of substantially parallel longitudinally extending exhaust gas passages of substantially equal length communicating with each other at one end only of the manifold, longitudinally extending open-ended conduits positioned in the passages of said manifold, a heater casing surrounding said manifold and spaced from the outer walls thereof, said casing being in open communication at its forward end with the atmosphere, and means establishing communication between the rear portion of said casing and the passenger compartment of a vehicle body.

2. Motor vehicle heating means comprising a manifold formed from a pair of sheet metal sections joined along contacting edge portions, the said sections being transversely bowed to provide therein upper and lower longitudinally extending parallel gas receiving passages of equal length, the said passages being in relative communication at one end only of the manifold, longitudinally spaced gas inlets provided in the lower of said passages, a gas outlet provided at the forward end of the upper passage and disposed in substantially the horizontal plane of the lower of said passages, an open-ended air heating conduit passing axially and longitudinally through at least one of said passages, and a sheet metal casing surrounding said manifold, said casing being open at its forward end and communicating at its rear end with the interior of the passenger compartment of an associated vehicle.

3. An automobile heater comprising a manifold attachable to the side of an internal combustion engine to directly receive the heated exhaust gases issuing from the engine cylinders, said manifold including a welded sheet metal body having longitudinally extending upper and lower passages of uniform length which communicate with one another at one end only of the manifold, an open-ended air heating conduit extending axially through at least one of said passages, and a sheet metal casing surrounding said manifold, said casing being open at its front to the atmosphere and having at its rear an outlet for the discharge of heated air.

4. An automobile heater comprising a manifold directly attachable to the side of an internal combustion engine to receive the heated exhaust gases issuing from the cylinders of said engine, said manifold including a sheet metal body composed of two sections formed to present substantially duplicate parallel upper and lower passages for the travel of heated exhaust gases through said manifold, said passages being in relative communication at the rear end only of the manifold, longitudinally spaced gas inlets communicating with the lower of said passages, a gas outlet provided in connection with the forward end of the upper of said passages, the said outlet being disposed substantially in the plane of the lower of the passages, and a sheet metal casing surrounding said manifold to produce an air heating passage between the outer surfaces of said manifold and said casing.

5. An exhaust gas manifold for internal combustion engines comprising a sheet metal body having inner and outer secions joined along their adjacent edge portions, the said sections being provided with reversely bent registering sides forming parallel longitudinally extending passages for the travel of engine exhaust gases, the said passages being of equal length and in relative communication at the rear end only of the manifold, longitudinally spaced gas inlets formed with the inner of said sections in registration with the lower passage, a gas outlet formed in the outer of said sections in communication with the forward end of the upper of said passages, and reenforcing means surrounding said gas inlets and outlets for resisting compression forces.

6. An exhaust gas manifold for internal combustion engines comprising a sheet metal body having inner and outer sections joined along their adjacent edge portions, the said sections being provided with reversely bent registering sides forming parallel longitudinally extending passages for the travel of engine exhaust gases, the said passages being of the same length and in relative communication at the rear end only of the manifold, longitudinally spaced gas inlets formed with the inner of said sections in registration with the lower passage, a gas outlet formed in the outer of said sections in communication with the forward end of the upper of said passages, reenforcing means surrounding said gas inlets and outlets for resisting compression forces, and means passing through said reenforcements for directly uniting said manifold in connection with the side of an associated engine.

7. An exhaust gas manifold for internal combustion engines comprising a pair of sheet metal sections joined together along their abutting edges, registering trough-shaped depressions formed in the sides of said sections and producing within the manifold upper and lower longitudinally extending passages for the travel of exhaust gases, the said passages being in relative communication at the rear end only of the manifold, longitudinally spaced gas admitting ports formed in connection with the inner of said sections and entering the lower of said passages, a gas discharging port formed in connection wtih the outer of said sections and communicating with the forward end of the upper of said passages, an open-ended conduit passing longitudinally and axially through each of said passages, and a divisional wall separating the forward ends of said passages in registration with the gas outlet port.

8. In automobile heating means, a manifold directly attachable to the side of an internal combustion engine to receive the heated exhaust gases issuing from the cylinders of the engine, said manifold including a welded sheet metal body having parallel upper and lower equal length passages in relative communication with each other at one end only of the manifold, the lower of said passages being provided with ports for admitting exhaust gases into said manifold and the upper of said passages being provided at its forward end with a gas discharging port, open-ended conduits extending longitudinally through said passages, and a sheet metal casing surrounding said manifold and at least partially spaced from the exterior of said manifold to produce a longitudinally extending air heating passageway.

9. An automobile heater comprising a manifold attachable to the side of an internal combustion engine to directly receive the heated exhaust gases issuing from the cylinders of said engine, said manifold including a sheet metal body having parallel upper and lower passages communicating with each other at one end only of the manifold, open-ended conduits extending axially through the parallel upper and lower passages of said manifold and forming between the same and the inner walls of said passages an annular reversely bent passageway for the travel of exhaust gases through the manifold, a noise reducing covering surrounding said conduits, and a sheet metal casing secured to and surrounding said manifold to substantially enclose the latter, said casing being open at its front to the atmosphere and provided at its rear with an outlet for the discharge of air heated therein.

10. An automobile heater comprising a manifold attachable to the side of an internal combustion engine to directly receive the heated exhaust gases issuing from the cylinders of said engine, said manifold including a sheet metal body having parallel upper and lower passages communicating with each other at one end only of the manifold, open-ended conduits extending axially through the parallel upper and lower passages of said manifold and forming between the same and the inner walls of said passages an annular reversely bent passageway for the travel of exhaust gases through the manifold, a noise reducing foraminated metallic covering surrounding said conduits, and a sheet metal casing secured to and surrounding said manifold to substantially enclose the latter, said casing being open at its front to the atmosphere and provided at its rear with an outlet for the discharge of air heated therein.

CHARLES M. FRANCISCO.